United States Patent
Zdeblick et al.

(10) Patent No.: US 7,867,374 B2
(45) Date of Patent: Jan. 11, 2011

(54) ACTIVE MATRIX ELECTROCHEMICAL MACHINING APPARATUS AND METHOD

(75) Inventors: William J. Zdeblick, Ann Arbor, MI (US); Yuefeng Luo, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 1419 days.

(21) Appl. No.: 11/241,206

(22) Filed: Sep. 30, 2005

(65) Prior Publication Data

US 2006/0070887 A1 Apr. 6, 2006

Related U.S. Application Data

(60) Provisional application No. 60/615,240, filed on Oct. 1, 2004, provisional application No. 60/659,461, filed on Mar. 8, 2005.

(51) Int. Cl.
*B23H 3/04* (2006.01)
*B23H 7/32* (2006.01)

(52) U.S. Cl. ............... 205/649; 204/224 M; 204/229.5

(58) Field of Classification Search ............... 205/649; 204/224 M, 229.5
See application file for complete search history.

(56) References Cited

U.S. PATENT DOCUMENTS

| | | | |
|---|---|---|---|
| 3,372,099 A | 3/1968 | Clifford | 204/143 |
| 4,541,909 A | 9/1985 | Fromson | 204/129.2 |
| 5,164,033 A | 11/1992 | Whitehead | 156/345 |
| 5,759,362 A | 6/1998 | Van Kessel et al. | 204/290 R |
| 5,882,491 A | 3/1999 | Wardle | 204/290 R |
| 6,234,752 B1 | 5/2001 | Wei et al. | 416/96 R |
| 6,255,551 B1 | 7/2001 | Shapiro et al. | 588/204 |
| 6,290,461 B1 | 9/2001 | Wei et al. | |
| 6,454,930 B1 * | 9/2002 | Derighetti | 205/645 |
| 6,589,402 B2 | 7/2003 | Irie et al. | |
| 2002/0074222 A1 | 6/2002 | Cochran | 204/224 M |
| 2004/0040863 A1 | 3/2004 | Lee et al. | 205/640 |
| 2006/0091005 A1 | 5/2006 | Toma et al. | |

FOREIGN PATENT DOCUMENTS

| | | |
|---|---|---|
| JP | 2003305616 | 10/2003 |
| JP | 2003305616 A * | 10/2003 |

\* cited by examiner

*Primary Examiner*—Alexa D. Neckel
*Assistant Examiner*—Nicholas A. Smith
(74) *Attorney, Agent, or Firm*—Robert L. Stearns; Dickinson Wright, PLLC

(57) ABSTRACT

An apparatus and method of electrochemical machining utilizes a computer controlled static array of electrically insulated cathode sections to selectively and individually energize the electrodes for the purpose of shaping the surface of a part. The tightly clustered array of electrodes can be formed by individual wires as an example. The waste reaction products may be managed so as to improve machining accuracy. The electrodes can be composed of materials capable of generating an oxide layer or that resist electrolytic dissolution to combat the problem of crossover erosion in closely spaced conditions. An alternative approach to remedy crossover erosion is to extend the reach of insulation into the gap space between tool and part.

10 Claims, 8 Drawing Sheets

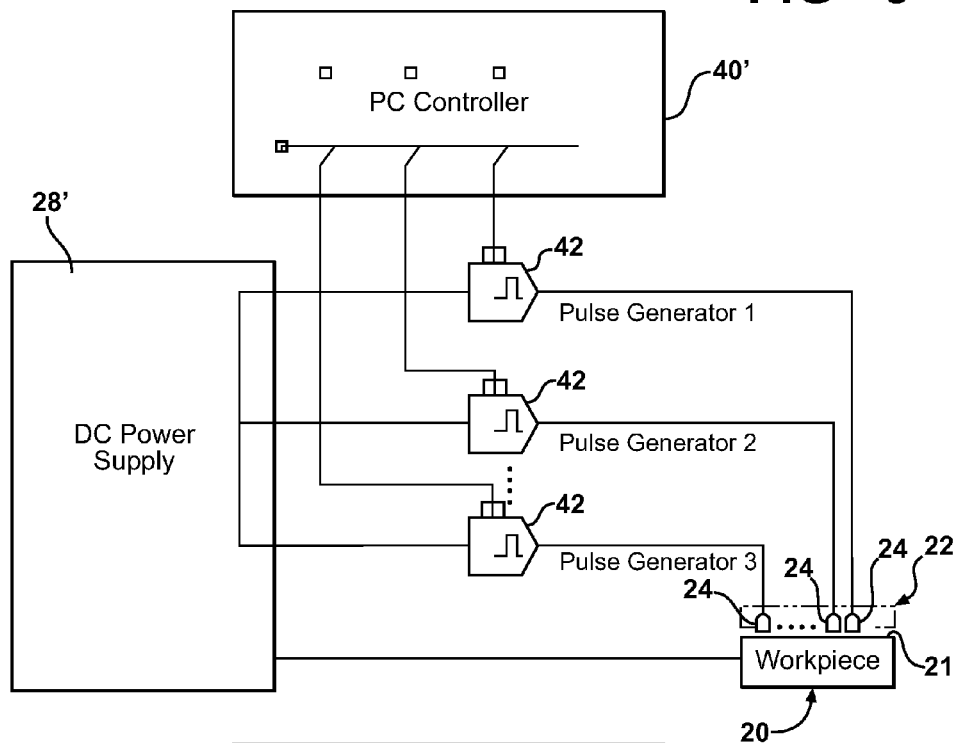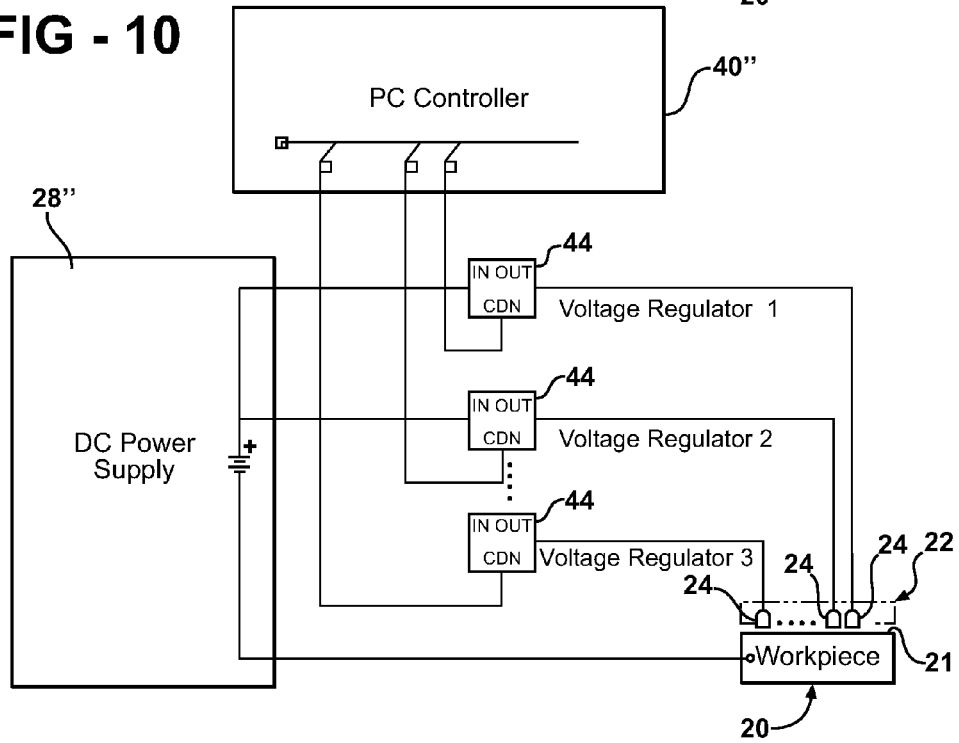

ACTIVE MATRIX ELECTROCHEMICAL MACHINING APPARATUS AND METHOD

RELATED APPLICATIONS

This patent application claims the benefit of and full priority to U.S. Provisional Application No. 60/659,461 filed Mar. 8, 2005 and U.S. Provisional Application No. 60/615,240 filed Oct. 21, 2004.

BACKGROUND OF THE INVENTION

1. Field of the Invention

This invention relates generally to an apparatus for and method of electrochemical machining (ECM). More particularly, it relates to an arrayed multi-electrode ECM apparatus and method of shaping an infinite variety of part surfaces from a static, generically-shaped cathode array.

2. Related Art

In a conventional electrochemical machining (ECM) process, metal removal is achieved by electrochemical dissolution of an anodically polarized part as one component in an electrolytic cell. Both a tool electrode (cathode) and the part (anode) are placed in an electrolyte, and a potential voltage is applied. On the anode (positive) side of the cell, the metal atoms ionize and break free of the part surface. These metallic atoms are combined with hydroxide ions in the electrolyte to form metal hydroxide. On the cathode (negative) surface, hydrogen ions are reduced to hydrogen gas. The reaction product; which comprise the metal hydroxide and $H_2$ gas, are flushed away by the electrolyte flow.

According to conventional techniques, the machining surface of the tool is contoured, or profiled, into a generally negative shape relative to the desired design shape and the part. Thus, the erosion of the anode creates a copy image of the contour or profile of the machined or shaped surface in the tool.

Both tool and part are typically single block conductors, usually made of metallic materials or alloys. A tool having multiple or segmented electrodes each with different electrical potentials at different locations however is known predominantly for surface leveling or planing. Such tools also require one or both of the tool and part to move during the machining operation. These multi-segmented approaches have had limited usefulness and applicability, particularly because of the fact that waste reaction products from electrochemical dissolution accumulate at various locations upon the electrode segments making the machining process difficult to control. If a cloud of waste reaction products enter the gap between an electrode segment and the part during ECM, then poor machining accuracy could result due to unstable or unpredictable conditions in the current density. Furthermore, prior multi-segmented designs have been predominantly course with relatively large insulated spacing between adjacent electrodes. This is because of the destructive crossover erosion phenomenon that can attack electrode surfaces if its voltage is left to float while the adjacent electrode voltage is sufficiently energized. Such inherent limitations in prior art processes using multi-segmented apparatus have obstructed the performance enhancements that would otherwise be achievable. For instance, the post machining surface form of a part may deviate from the desired control shape expected using the multi-segment electrode system due to sludge or waste product build-up within the electrolyte flow channel, particularly near its end or in regions where the gap spacing is reduced. However, small flow channel spacing is extremely desirable for high machining accuracy, yet exacerbates the waste product problem. Similar problems arise if electrodes become damaged through the crossover erosion phenomenon.

Various approaches have been proposed to overcome limitations associated with single and multiple electrode ECM processes, such as feeding the tool during the ECM process to maintain better control of the electrode gap spacing and the resultant ECM voltage and/or current. Such traditional processes require sacrificial stock on the part surface to achieve the surface profile by electrode feeding, thereby increasing the cycle time and cost. Another approach has been to rotate the tool and/or part during machining to avoid clogging and/or accumulation in the electrode gap and to control the ECM current and/or voltage. However, such approaches are not necessarily desirable or even feasible in all ECM applications. Particularly, they have not been demonstrated to be practical in producing contour profiles starting from generally flat surfaces, such as, for example, in the field of metallic cylinder head gaskets where a contoured stopper feature can be utilized to better distribute head bolt loading.

Therefore, it is desirable to develop an ECM apparatus and method of its operation which utilizes multi-segmented electrodes in an array, particularly in apparatus and method which is adapted for selective and individual control of each of the electrodes and which is also adapted to control the waste cloud of reaction products as they travel along the flow channel in the electrode gap region. Further, it is desirable to develop an apparatus and method which does not require rotation or relative movement of any kind between the tool and part or the feeding of one or more segmented electrodes of the tool toward the surface of the part during the ECM process. It is also desirable to develop an ECM apparatus and method which utilizes a multi-segmented tool having a generic machining surface which is adapted to produce an infinite variety of contoured profiles. It is desirable to eliminate the sacrificial stock for less energy/material consumption and higher accuracy. Still further, it is desirable to develop such a system in which the apparatus and method are adapted for programmable control of the part surface profile by a computer, such as the computer of a digital process controller.

SUMMARY OF THE INVENTION

The invention contemplates a method of shaping the surface of an anodically polarized part through the action of electrochemical dissolution using a static, generic, multi-segmented electrode array. The method comprises the steps of providing a tool having a plurality of electrodes each with a distal machining surface, supporting the plurality of electrodes in an ordered array, electrically insulating each electrode from another, establishing an electrical circuit with all of the electrodes, providing a part having a work surface to be machined, supporting the part with its work surface in opposing spaced relation to the machining surface of the electrodes, flowing an electrolyte through the space between the work surface and the machining surfaces, and selectively varying the electrical energy profile delivered to specific electrodes to develop a three-dimensional formation on the work surface. The invention includes the added step of supporting the machining surfaces of all of the electrodes in fixed relation to one another and in fixed relation to the part throughout the entire shaping operation.

According to another aspect of the invention, a method of shaping the surface of an anodically polarized part through the action of electrochemical dissolution using a multi-segmented electrode array comprises the steps of providing a tool having a plurality of electrodes, each with a distal machining surface, supporting the plurality of electrodes in an ordered array, electrically insulating each electrode from another, establishing an electrical circuit with all of the electrodes, providing a part having a work surface to be machined, supporting the part with its work surface in opposing spaced relation to the machining surfaces of the electrode, flowing an electrolyte through the space between the work surface and the machining surfaces, and selectively varying the electrical energy profile delivered to specific electrodes to develop a three-dimensional formation on the work surface. According to this aspect of the invention, the method includes the added step of reducing crossover erosion on the machining surfaces of the electrodes.

Another aspect of the invention comprises an electrochemical machining apparatus for shaping the surface of an anodically polarized part through the action of electrochemical dissolution. The apparatus comprises a tool having a plurality of electrodes supported in an array, each of the electrodes having a distal machining surface. A barrier electrically insulates each electrode from another. A power supply provides electrical energy. A part having a work surface to be machined is positioned in opposing spaced relation to the machining surfaces of the electrodes. An electrolyte flow channel is defined in the space between the work surface and the machining surfaces. A controllable interface operatively interconnects the power supply to the plurality of electrodes for independently and selectively completing an electrical circuit to each of the electrodes. According to this aspect of the invention, each of the electrodes comprise a flexible wire, and the barrier comprises a flexible insulating jacket surrounding each wire.

According to yet another aspect of the invention, an electrochemical machining apparatus is provided for shaping the surface of an anodically polarized part through the action of electrochemical dissolution. The apparatus comprises a tool having a plurality of electrodes supported in an array. Each of the electrodes has a distal machining surface. A barrier electrically insulates each electrode from another. A power supply provides electrical energy. A part having a work surface to be machined is placed in opposing spaced relation to the machining surfaces of the electrode, with an electrolyte flow channel defined in the space between the work surface and the machining surfaces. A controllable interface operatively interconnects the power supply to the plurality of electrodes for independently and selectively completing an electrical circuit to each electrode. According to this aspect of the invention, a means is provided for reducing crossover erosion on the machine surfaces of the electrodes.

According to these various aspects of the invention, the disadvantages and shortcomings of the prior art electrochemical machining apparatus and methods are overcome.

BRIEF DESCRIPTION OF THE DRAWINGS

These and other features and advantages of the present invention will become more readily appreciated when considered in connection with the following detailed description and appended drawings, wherein:

FIG. 9 is a schematic illustration of a second power distribution embodiment of the invention;

FIG. 10 is a schematic illustration of a third power distribution embodiment of the invention;

DETAILED DESCRIPTION OF THE PREFERRED EMBODIMENT

Figure 1:
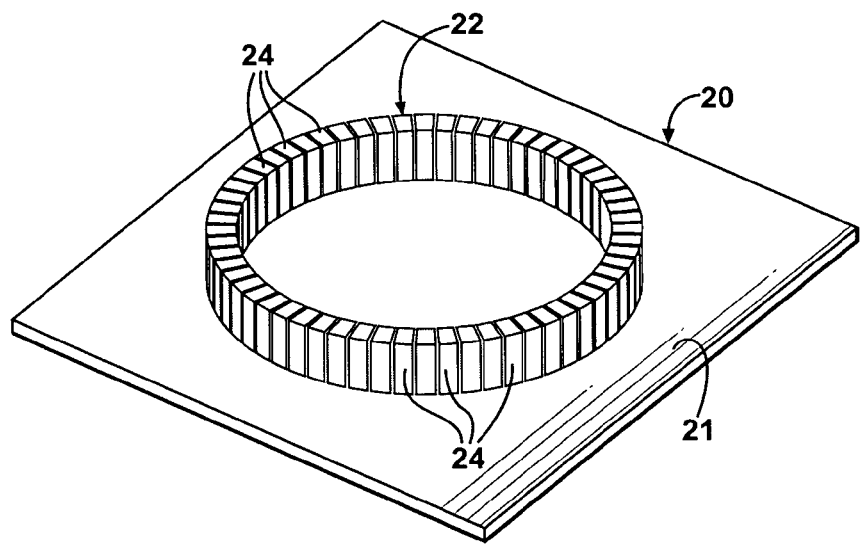
FIG. 1 is a schematic perspective view of a tool/part configuration of the invention.
Figure 2:
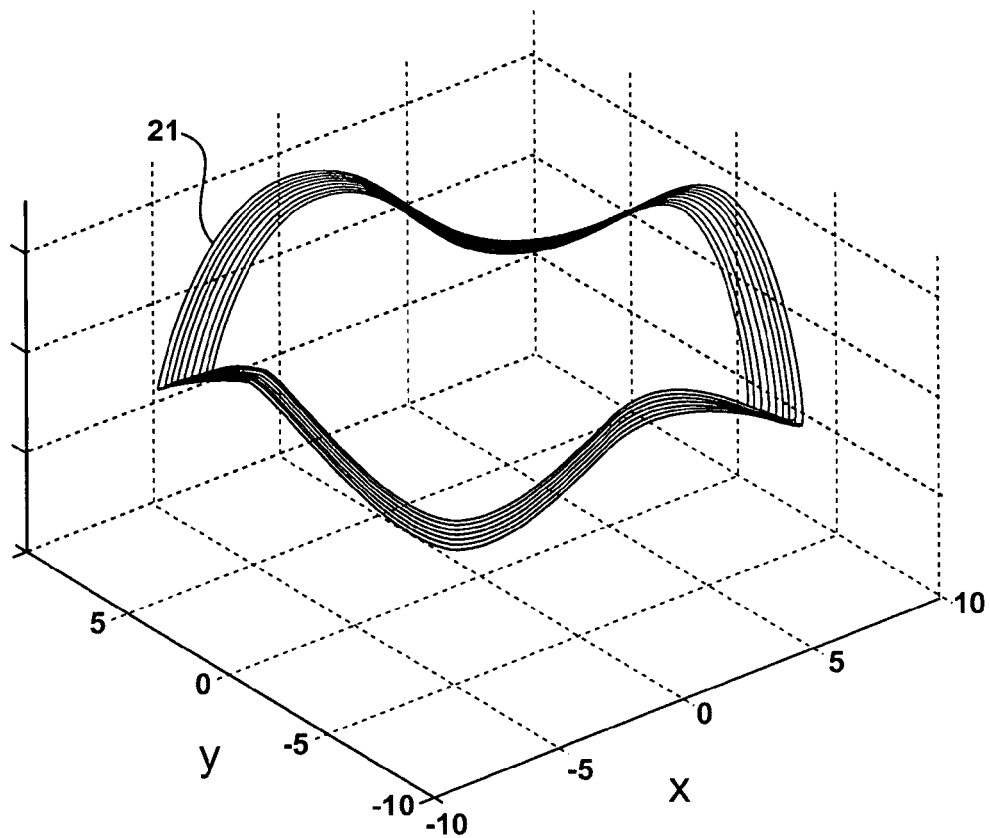
FIG. 2 is a schematic perspective view of a shaped surface of the part depicted in exaggerated Z-axis proportions to emphasize the three-dimensional formation on the work surface.

Referring to the Figures, wherein like numerals indicate like or corresponding parts throughout the several views, an apparatus and method for shaping the surface 21 of an anodically polarized part, generally indicated at 20, through the action of electrochemical dissolution using a static, generic, multi-segmented tool, generally indicated at 22, is depicted in various configurations and alternative conditions. In FIG. 1, the tool 22 is illustrated as a plurality of discrete (i.e., segmented) electrodes 24 ordered in an annular array. Although not visible in FIG. 1, each electrode 24 is insulated from the next by an appropriate insulating material which may, for example, comprise a plastic or other material. Each electrode 24 has a distal machining surface 26 (FIGS. 3 and 11-14). In FIG. 1, the machining surfaces 26 are hidden from view, but comprise the annular surface which is presented toward the part 20. When an electrical circuit is completed (FIGS. 8-10), an electrolytic cell is established with the part 20 as the anode and each of the electrodes 24 as individual cathodes. An electrolyte, depicted in various Figures as a directional arrow 30, is flowed through the space between the work surface 21 and the machining surfaces 26 to facilitate the transportation of particles from the work surface 21 as a cloud of waste reaction products (best shown in FIGS. 11A-C). The electrolyte can be any suitable type, including saline or sodium nitrate. By selectively varying the electrical circuit (via voltage, current, sequence, timing and/or duration) established to specific electrodes 24, a three-dimensional formation can be developed on the work surface 21, as shown illustratively in FIG. 2.

Figure 3:
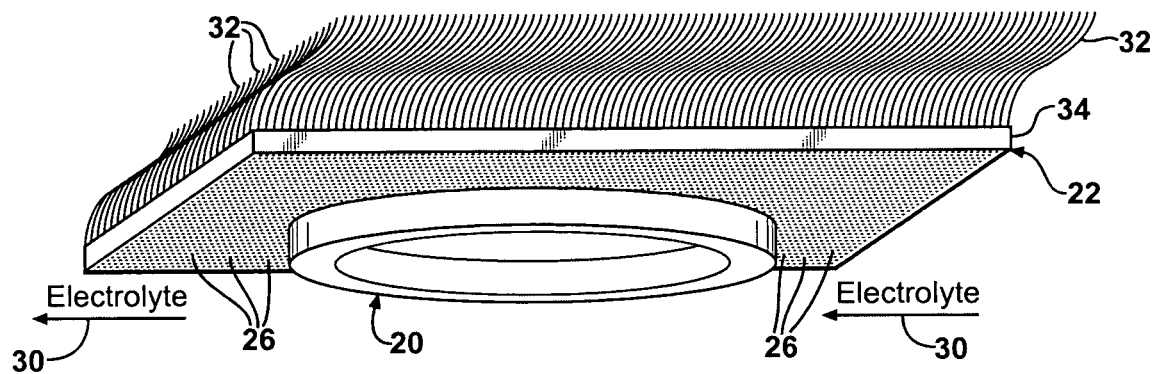
FIG. 3 is a simplified perspective view showing an embodiment of the invention wherein the electrodes each comprise a flexible wire.
Figure 4:
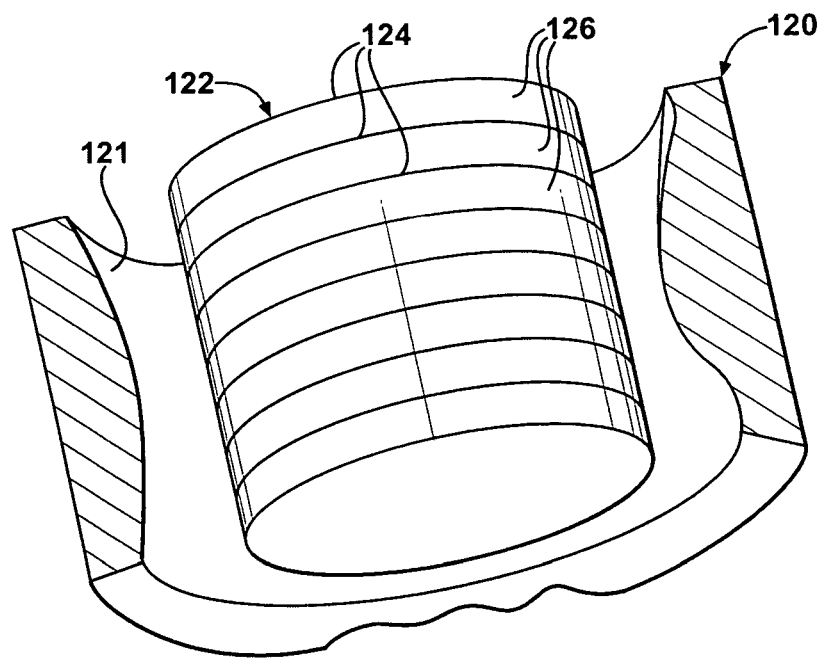
FIG. 4 is a perspective view of an alternative multi-segmented electrode array of the invention.
Figure 5:
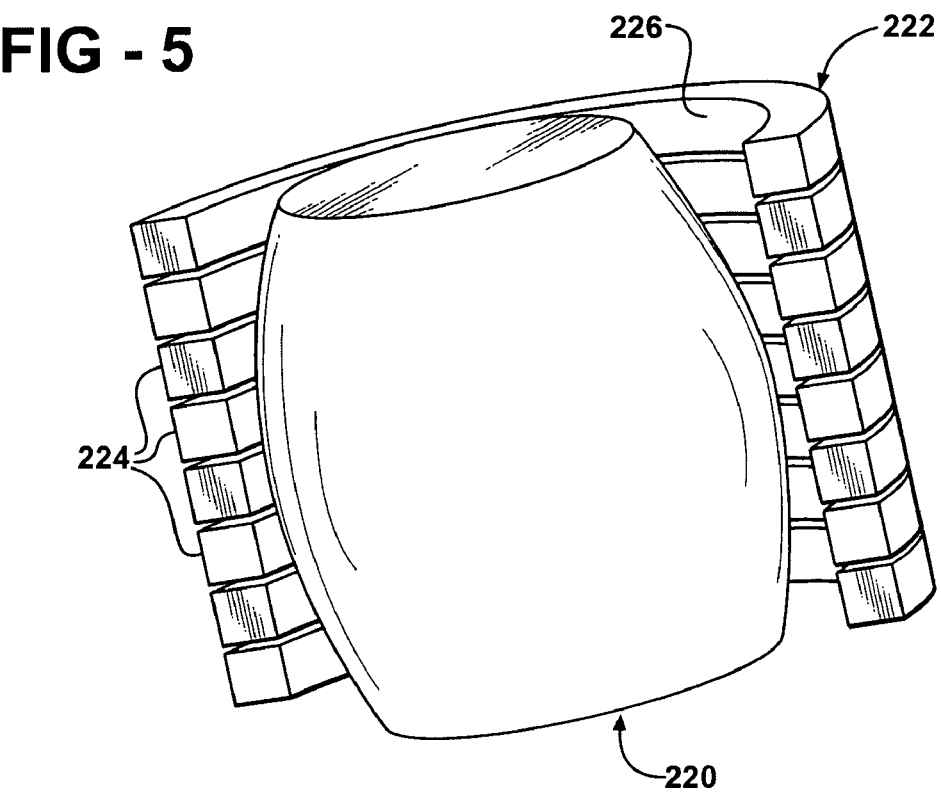
FIG. 5 is a perspective view of another alternative multi-segmented electrode array of the invention.
Figure 6:
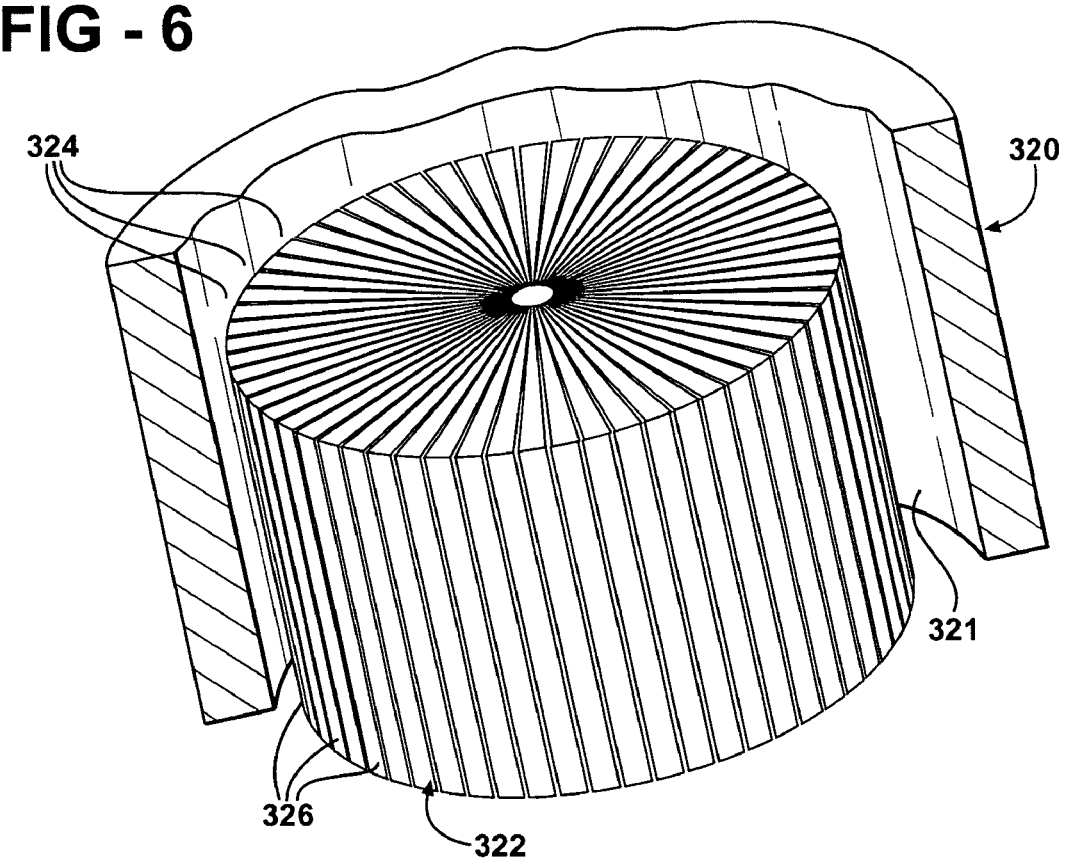
FIG. 6 is a perspective view of yet another alternative multi-segmented electrode array of the invention.
Figure 7:
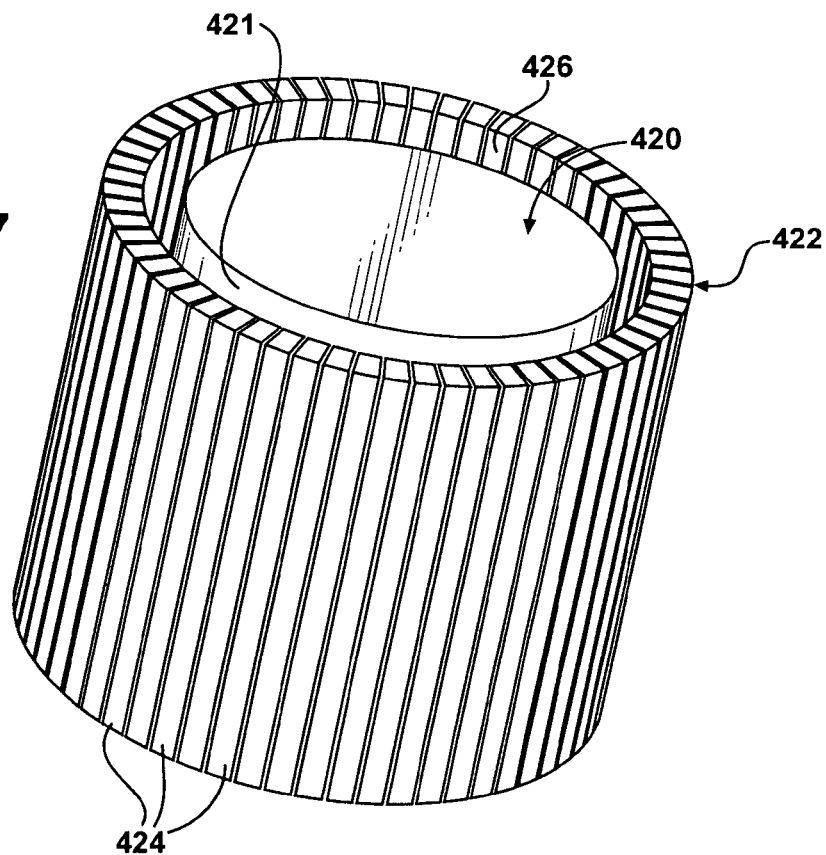
FIG. 7 is a perspective view of a still further alternative multi-segmented electrode array of the invention.

The tool 22 can take many different shapes. In FIG. 1, the machining surfaces 26 of the tool 22 are arranged as an annular geometry. In FIG. 3, the machining surfaces 26 are arranged as a planar area. In FIG. 4, where the prefix "1" has been added to the prior established reference numbers for clarity, the machining surfaces 126 are arranged as an inner-cylindrical surface. In FIG. 5, where the prefix "2" has been added to the prior established reference numbers for clarity, the machining surfaces 226 are arranged as an outer-cylindrical surface. FIGS. 6 and 7, employing prefixes "3" and "4" respectively, also represent inside and outside cylindrical surfaces, however, the individual electrodes 324, 424 are arranged as an axial stack of discrete cylindrical surfaces, whereas in FIGS. 4 and 5 the machining surfaces 126, 226 comprise arcuate segments arranged radially. These examples are intended to demonstrate that the tool 22 may be any suitable, generic, geometric shape, in addition to the plane, cylindrical and tubular arrays described here. Furthermore, each individual electrode 24 may have any suitable shape, such as a polygon, a disc, a ring, or the other.

The electrodes 24 are preferably made of a conductive material, such as a metal. For ease of machinability and cost considerations, they are typically made of copper, aluminum, steel, or other such common conductive metal.

In FIG. 3, an alternative configuration is depicted wherein the electrodes 24 each comprise a flexible insulated wire which, when ganged together, form a predetermined array. Each of the insulated wires 32 has a conductive metal wire core for use as a wire electrode 24. In the depiction of FIG. 3, the individual wires 34 are shown arrayed in a plane or matrix. However, any surface can be formed using this technique, including annular, cylindrical, spherical, or the like. The wire electrodes 32 may have any suitable cross-sectional shape, including a circular cross-sectional shape or any of a number of other known cross-sectional shapes for wires, including oblate or ellipsoidal, square or rectangular, or any of a number of other arcuate or polygonal cross-sectional shapes, or combinations thereof. Each of the plurality of wires 34 in the tool 22 may have identical cross-sectional shapes or the cross-sectional shapes may be different from one wire to the next. They may represent a repeating pattern of several different shapes. The wire electrodes 32 are made of a conductor, typically metal, such as copper or aluminum. The distal tip of each wire electrode 32 comprises the machining surface 26.

The insulator coating on each wire 32 may be selected from any of the known insulator materials, including well-known coatings for electrical wires made of organic or inorganic insulating materials. In this embodiment, very fine resolution can be achieved in surface machining/texturing since each individual wire electrode can be individually controlled. If the optimal resolution for a given application is less than (i.e., more coarse) than system capability, then the wire electrodes 24 can be treated as groups or sections that are simultaneously fired and de-energized.

A rigid matrix 34 fixedly secures each of the wire electrodes 24 in their continuous surface configuration. The rigid matrix 34 may be formed of any suitable material, including metals, plastics, ceramics, or other materials. The matrix material will preferably be selected for compatibility in forming the tool 22 shape and with respect to the electrolyte used. The matrix 34 can, for another example, be composed of a traditional potting material such as of the type known and used for fixing the position of wires as well as sealing them with respect to the electrolyte. Such potting materials are typically dialectric materials so that they do not affect the electric field associated with the electrodes 24 at the machining surfaces 26 during the shaping operation. Examples of suitable dialectrics include various engineering thermoplastic and thermoset materials, including various non-conductive epoxies.

Figure 8:
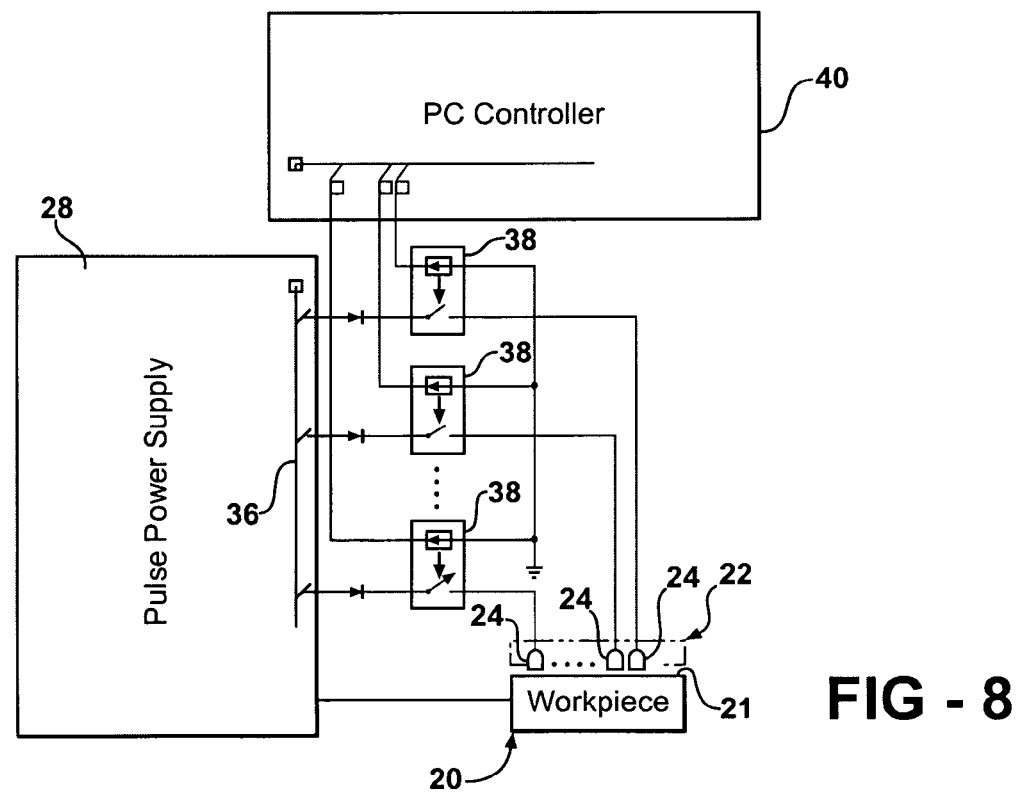
FIG. 8 is a schematic illustration of one power distribution embodiment of the invention.

Referring now to FIG. 8, an exemplary electrical circuit for the subject invention is depicted. In this Figure, the part 20 is shown schematically, and the tool 22 is represented by the broken figure. Three representative electrodes 24 are shown, it being understood that in the preferred embodiment a substantially larger number of electrodes 24 would be incorporated into the tool 22. A power supply 28 is shown as a single unit, but in an alternative application, multiple power supplies 28 may be used for various design efficiencies. The power supply 28 is preferably a DC power supply adapted to provide a voltage and a current to each individual electrode 24 in the tool 22. In this embodiment, the power supply 28 is of the pulse power type adapted to provide voltage pulses through a power bus 36. A pulse power type of power supply is desirable for use in conjunction with digital process controls further described below. The pulse parameters may include pulse width, pulse interval, pulse count, and pulse amplitude or voltage amplitude. The pulse width and interval preferably range from about 1-500 milliseconds. The pulse voltage preferably ranges from about 5-35V.

A switch 38 is switchable between open and closed conditions, and associated with each electrode 24. The switches 38 are part of a controller 40, which may be a digital process controller, for providing programmable control to each electrode 24. The controller 40 independently and selectively activates the individual switches 38 according to a predetermined program so that electrical energy from the power supply 28 is delivered to each electrode 24 in an appropriate sequence and for a predetermined period of time. In other words, the controller 40 selectively varies the electrical profile delivered to specific electrodes to develop a three-dimensional formation on the work surface 21. When energized, each electrode 24 initiates an electrolytic process through the medium of the electrolyte wherein atoms from the part (anode) are removed under the influence of a current density and attempt to form metal hydroxide (with hydrogen gas as a by-product). However, the flow of electrolyte 30 preferably sweeps the metal hydroxide along with the hydrogen bubbles, i.e., the waste reaction products, in a downstream direction. Thus, the plurality of switches 38 are opened or closed, thereby providing voltage pulses to their corresponding electrodes 24 in accordance with a predetermined computer switching control program or algorithm carried out within or through the controller 40, such as a digital process controller. Thus, certain switches 38 are opened to prevent voltage pulses from being supplied to other electrodes. The switching sequence and duration for which voltage pulses are applied depends on the design profile desired in the part (FIG. 2), the material of the part 20, the electrolyte 30 and its concentration and temperature, the rate of flow of electrolyte, waste cloud management objectives, and other well-known factors associated with electrochemical machining processes.

The pulsing power supply 28 determines the settings of voltage level, pulse width, pulse interval and total pulse counts. Down the line, the controller 40 affects control of the application of the power pulses from the power supply 28, or not, to each of the electrodes 24 thereby promoting electrochemical machining upon the surface to be machined 21. Thus, for a given time interval, the voltage and pulse settings are fixed on the cathode side for the electrodes which are being individually energized according to a predetermined sequence. The switched off electrodes 24 obtain no power, and thus little or no electrochemical reaction occurs at the machining surfaces 26 opposite these electrodes 24. The controller 40 is used to coordinate the operation of the power supply 28 and switches 38 to affect control of the power to the corresponding electrodes 24.

FIG. 9 illustrates another embodiment of the invention which utilizes a control scheme of independent pulse generation. As shown in FIG. 9, the power supply 28' comprises a general, fixed voltage DC power supply and many independent switching units 42 as pulse generators. The switching units 42 are adapted to apply a predetermined voltage as a plurality of controlled voltage pulses, in similar fashion as described with regard to the embodiment of FIG. 8. The pulse characteristics obtainable by the switching units 42 may be fixed or variable depending on the type of switching unit 42 that is chosen. The application of the pulses to the electrodes is controlled by controller 40'. Switching units 42 are preferably identical, but may also be different and adapted to provide voltage pulses having differing characteristics. The switching units 42 are connected to their corresponding electrodes 24 individually. The switching units 42 are adapted to receive the data with respect to the pulse settings directly from the controller 40' and can generate different voltage pulses with different frequencies depending on the control algorithm implemented within the controller 40'. An individual switching unit 42 preferably contains a programmable oscillator and a power amplifier or amplifiers among other essential components. The independent pulse generation scheme as depicted in FIG. 9 is advantageous in that it provides greater flexibility of control of the voltage pulse characteristics and individual control of the pulse settings for each individual electrode 24.

FIG. 10 illustrates yet another embodiment of which utilizes a control scheme of variable voltage elements. As shown in FIG. 10, the power supply 28" is preferably a general, fixed voltage DC power supply as described in the preceding embodiment. A programmable voltage regulator 44 is electrically connected to a corresponding one of each of the electrodes 24. The controller 40" in this embodiment includes multiple interfaces to control the programmable voltage regulators 44 according to either an open-loop scheme or a feedback scheme, as is well known. In this embodiment, the voltage levels and pulse characteristics applied to the individual electrodes 24 can be controlled directly by the controller 40". An ECM method and apparatus which deploys variable voltage elements is advantageous because it allows the most flexible control over power distribution to the electrodes 24.

The cathode array ECM process with its distinctive space controllability provides many opportunities for improved performance and functionality. First, the process enables controlled variable anodic dissolution with a static (i.e., fixed or immobile) tool configured as a universal (generic) geometry. The control sequence of the individual electrodes 24 can easily create an infinite variety of surfaces 21 geometries via computer numeric control methods. Secondly, the space controllability over the sequencing of which electrodes 24 are energized and the duration for which they are energized can be utilized to manage the distribution of waste reaction products within the electrolyte flow channel. In particular, and referring to FIGS. 11A-C, the waste reaction products of metal hydroxide and hydrogen bubbles are represented as a cloud of particles 46. This waste cloud 46 is formed when the first electrode 24 (1) is energized but adjacent electrodes 24 (2 and 3) are not energized. Preferably, the electrodes 24 are energized in a timed sequence so as to avoid the interference of the waste cloud 46 with other electrodes. If not properly managed, certain narrow or constricting portions of the electrolyte flow channel, and can deposit themselves undesirably upon downstream electrodes 24. If the waste cloud 46 passes under the machining surfaces 26 of other electrodes 24 when they are energized, it will change the conductivity of the local electrolyte and thereby negatively affect the desired material removal associated with that electrode and the accuracy of the resulting profile contour on the work surface 21. Thus, if appropriate space compensation is not addressed by managing the sequence and timing and duration for which various electrodes 24 are energized along the array, the ECM surface profile in the work surface 21 may develop undesirable process error due to the inherent inaccuracy of the predicted rates of surface diffusion and convection within the contaminated electrolyte.

Figure 11A:
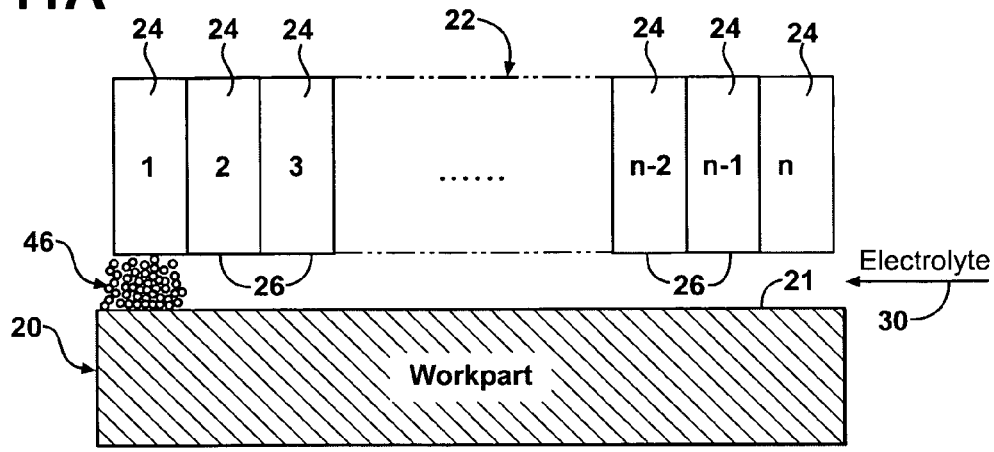
FIGS. 11A-C depict a progression in the electrochemical machining method wherein individual electrodes are energized in a sequence to control the flow of waste reaction products of electrochemical dissolution.
Figure 11B:
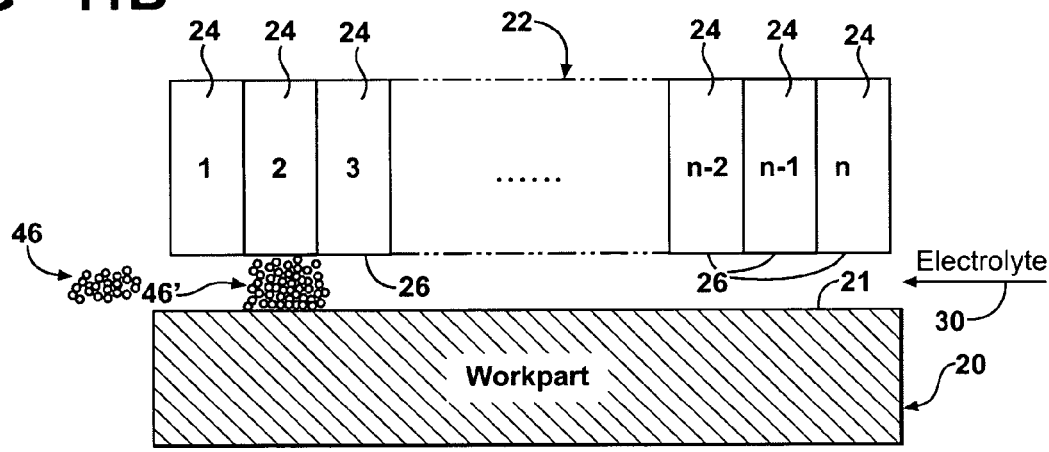
Figure 11C:
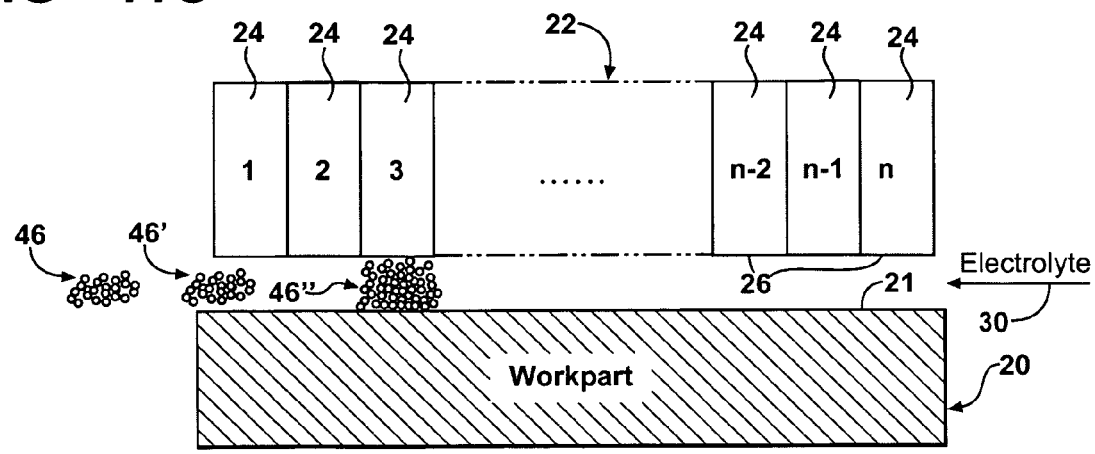

Thus, a management strategy directed to the sequence and timing at which various electrodes 24 within the tool 22 are fired is depicted in FIG. 11A-C. The control strategy, which can be implemented either individually or in groups of electrodes 24, can be effective to avoid the interference of the reaction products 46 of one electrode (or group of electrodes) 24 with the reaction which is intended to occur at another electrode (or group of electrodes) 24. This may be described generally as exercising programmable control of the predetermined sequence, timing, and duration at which the electrodes 24 are energized so as to reduce the possibility of reaction products from the waste cloud 46 to pass through the gap space while any one or more electrodes 24 are fired. This sludge management strategy can be carried out in many ways. One control strategy example has an electrode 24 which is generally near to the downstream region of the electrolyte flow channel energized prior to electrodes which are generally near to the upstream region of the electrolyte flow channel. This "back-stepping" sequence and timing has the effect of reducing the impact of the upstream reaction products on the desired downstream reactions. Of course, other management strategies can be mapped given electrolye flow rates and electrode timings, sequences and durations.

To more fully describe the first exemplary control strategy and referring specifically to FIGS. 11A-C, the switching sequence is from the electrode 24 (1) nearest to the electrolyte outlet toward the electrode 24 (n) nearest to the inlet. By this process, when the first electrode 24 (1) is switched "on" as represented in FIG. 11A, the waste reaction products, including sludge in the form of metal hydroxides and hydrogen bubbles, exit as a cloud 46 immediately in the flow 30 of electrolyte. Next, the first electrode 24 (1) is de-energized by switching the voltage "off" and the next electrode 24 (2) is energized by switching the voltage "on". The waste cloud 46' from the next electrode 24 (2) exits through the flow of electrolyte 30, as shown in FIG. 11B. The first electrode 24 (1) is de-energized at this point and thus is not influenced by the waste cloud 46'. Upon completion of the predetermined duration at which the second electrode 24 (2) or group of electrodes is energized, it is de-energized and then the next successive electrode 24 (3) or group of electrodes are energized as shown in FIG. 11C. The waste cloud 46" can thus be carried along the electrolyte flow 30, past the first and second electrodes 24 which have been turned "off" and thus are not affected by the waste reaction products. This progression of the sequence is preferably continued in like fashion until all electrodes have been energized. At this point, the sequence may be repeated if desired for any number of cycles until the desired profile has been obtained. The method may include a single sequence as described, or multiple repetitions of the sequence, depending on the desired profile and other factors. This predetermined sequence provides that the electrolytic reactions occur always in an uncontaminated electrolyte 30 because the waste clouds 46, 46', 46" are never inside the reaction zone of an energized electrode 24. The problematic sludge (metal hydroxide) and evolved gas bubbles are always downstream of the current reaction zone which skips fast upstream according to a programed switching sequence.

Figure 12:
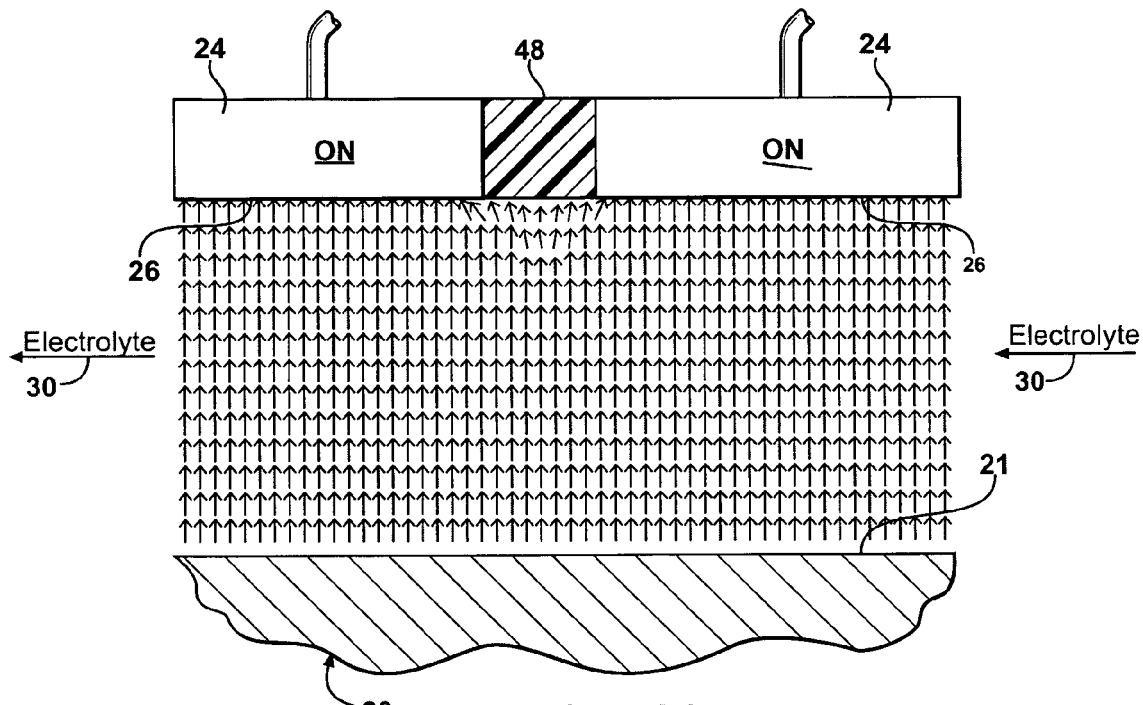
FIG. 12 depicts the electrical current distribution inside the ECM gap as developed by a finite element method, and wherein adjacent electrodes are both simultaneously energized.
Figure 13:
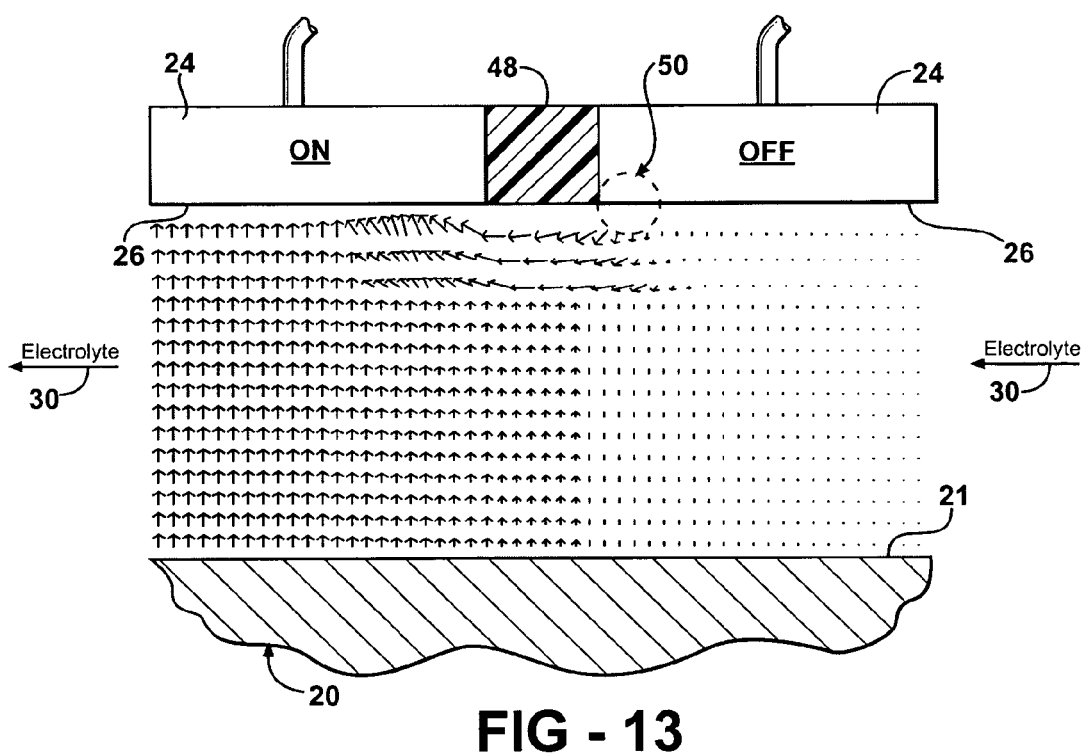
FIG. 13 is a current distribution depiction as in FIG. 12, but resulting from a condition wherein one electrode is energized and an adjacent electrode is either de-energized or committed to a floating mode such that conditions become favorable for crossover erosion to occur.

FIG. 12 shows the electrical current distribution inside the ECM gap with a narrow separation between adjacent electrodes 24. The finite element method is applied to simulate the current distribution by way of vectors which progress from the work surface 21 of the part 20 toward the machining surfaces 26 of the electrodes 24. An electrical insulator 48 is positioned between adjacent electrodes 24 for the purpose of establishing electrical isolation. As described above, the individual electrodes 24 are selectively and individually energized to accomplish an intended surface shaping technique. When adjacent electrodes 24 are both energized, the electrical field established within the gap region is essentially uniform and provides little or no erosion effects to the cathode materials. However, because it is necessary at times to de-energize an electrode 24 while its adjacent electrode 24 remains energized or left to take a floating electrical potential, the problem of crossover erosion can occur in the area 50 near the insulator 48 in the electrode 24 that is de-energized. Thus, as shown in FIG. 13, the turned "off" electrode 24 will take the floating electrical potential, resulting in some electrical current pointing away from the machining surface 26 near the insulator 48 in the crossover erosion area 50. The floating electrode 24 thus becomes a partial anode and local electrolytic dissolution can occur. The problem of crossover erosion is generally negligible when the separation between neighboring electrodes 24 is relatively large, such as found in prior art systems. However, the subject invention prefers closely spaced electrodes 24, wherein the insulator 48 is relatively small. If left untreated, crossover erosion can eat away at the machining surface 26 of the individual electrodes 24, causing a ridge in the opposing work surface 21 of the part 20.

In order to address this issue, the subject invention forms the machining surfaces 26 from a material composition which is capable of generating an oxide layer. By utilizing special cathode materials with different properties, the problem of crossover erosion can be reduced or eliminated. Suitable materials can generate a thin layer of strong but conductive oxide when subjected to anodic potential inside the salt electrolyte. The metal atoms on the surface are isolated from the double layer by the oxide layer. The thin oxide layer enables the electrochemical reactions that generate oxygen or other gasses but disable or impede the oxidation of the cathode metals per se. When the floating potential is turned into negative or zero potential, the electrode surface facilitates all the necessary electrochemical reductions and reduces the oxide layer as well. This category of materials that generate oxide layers includes titanium, tantalum, tungsten, and alloys containing these elements.

Another category of suitable materials conduct electricity but have much higher oxidation potential then the potential needed for metal erosion when the surface is subjected to the anodic potentials. The cathode is left floating, and the atoms or molecules of these materials cannot overcome the oxidation barrier and become ionized. They facilitate the oxygen generation by conducting the extra electrons away from the surface. The circuit remains closed for the electrochemical reaction but there is little material dissolved from the floating cathode. This second category of materials that have high oxidation potential include graphite, and conductive ceramics, such a dense graphite and very conductive ceramics (e.g., SiC) under room temperature.

In order to achieve these anti-crossover erosion advantages, the electrodes 24 can be composed entirely of the materials as described above, or can comprise the traditional materials of steel, stainless steel, copper, aluminum, and the like for easy machining and shaping but their surfaces coated by a material composition as described above. Coating technologies, such as chemical vapor deposition, plasma activated vapor processes, and the like can be implemented.

Figure 14:
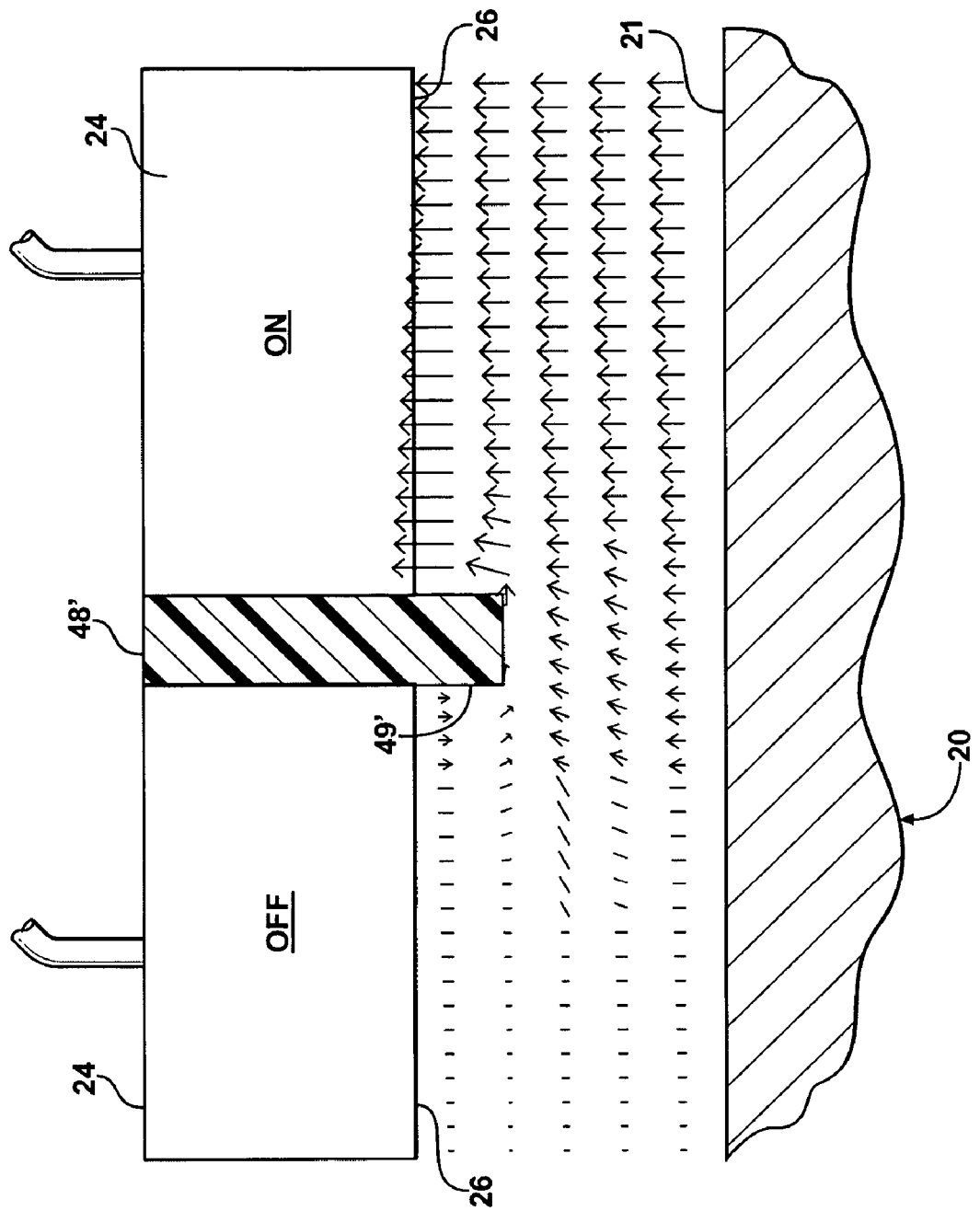
FIG. 14 is a view similar to FIG. 13, but illustrating an alternative technique for reducing crossover erosion

Yet another approach to combating crossover erosion is illustrated in FIG. 14. There, the insulator 48' is extended into the gap space so that a protruding end 49' stands proud of the machining surfaces 26. In this case, the current density in the edge region of the "off" electrode 24 is weakened due to the interruption caused by the protruding end 49'. These and other approaches are contemplated for reducing or eliminating the problem of crossover erosion.

Obviously, many modifications and variations of the present invention are possible in light of the above teachings. It is, therefore, to be understood that within the scope of the appended claims, the invention may be practiced otherwise than as specifically described.

What is claimed is:

1. A method of shaping the surface of an anodically polarized part through the action of electrochemical dissolution using a static, multi-segmented electrode array, said method comprising the steps of:

providing a tool having a plurality of electrodes each with a distal machining surface;

supporting the plurality of electrodes in an ordered array;

electrically insulating each electrode from another;

establishing an electrical circuit with all of the electrodes;

providing a part having a work surface to be machined;

supporting the part with its work surface in opposing spaced relation to the machining surfaces of the electrodes;

flowing an electrolyte through the space between the work surface and the machining surfaces;

selectively varying the electrical energy profile delivered to specific electrodes to develop a three-dimensional formation on the work surface;

and supporting the machining surfaces of all the electrodes in fixed relation to one another and in fixed relation to the part throughout the shaping operation; wherein the electrical circuit has an open condition and a closed condition, further including the step of preventing the establishment of a closed electrical circuit with an electrode when a waste cloud of reaction products are present in the space between the work surface and the machining surface of the electrode.

2. The method of claim 1 wherein said step of selectively varying the electrical energy profile includes intentionally controlling the flow of waste reaction products of electrochemical dissolution by manipulating the timing, duration and sequence electricity.

3. The method of claim 2 wherein said step of flowing the electrolyte includes routing the electrolyte from an upstream direction toward a downstream direction, and further including establishing an electrical circuit to an electrode positioned in a downstream direction prior to establishing an electrical circuit to an electrode positioned in an upstream direction.

4. The method of claim 1 wherein said step of selectively varying the electrical energy profile includes interrupting at least one of the voltage and the current supply to an electrode.

5. The method of claim 1 wherein said step of selectively varying the electrical energy profile includes altering the magnitude of at least one of the voltage and the current supply to an electrode.

6. The method of claim 1 wherein said step of establishing an electrical energy profile includes cyclically pulsing the voltage supply to an electrode.

7. An electrochemical machining apparatus for shaping the surface of an anodically polarized part through the action of electrochemical dissolution, said apparatus comprising:
- a tool having a plurality of electrodes supported in an array, each of said electrodes having a distal machining surface;
- a barrier electrically insulating each said electrode from another;
- a power supply for providing electrical energy;
- a part having a work surface to be machined in opposing spaced relation to said machining surface of said electrodes, wherein an electrolyte flow channel is defined in the space between said work surface and said machining surfaces;
- a controllable interface operatively interconnecting said power supply to said plurality of electrodes for independently and selectively completing an electrical circuit to each of said electrodes;
- and wherein said electrodes each comprise a flexible wire, and said barrier comprises a flexible insulating jacket surrounding each said wire, including a matrix securing said electrodes in a continuous surface configuration;
- wherein said electrolyte flow channel has an upstream region and a downstream region, said controller includes a programming circuit for selectively manipulating the sequence at which an electrical circuit is completed to said electrodes to facilitate electrochemical machining free from interference by upstream waste reaction products.

8. The apparatus of claim 7 wherein said controller includes a computer controlled switch.

9. The apparatus of claim 7 wherein said controller includes a voltage regulator.

10. The apparatus of claim 7 wherein said controller includes a pulse generator.

* * * * *